(12) United States Patent
Kelley et al.

(10) Patent No.: US 9,711,784 B2
(45) Date of Patent: Jul. 18, 2017

(54) ELECTRODE FABRICATION METHODS AND ASSOCIATED SYSTEMS AND ARTICLES

(71) Applicants: Sion Power Corporation, Tucson, AZ (US); BASF SE, Ludwigshafen (DE)

(72) Inventors: Tracy Earl Kelley, Tucson, AZ (US); Savannah V. Burnside-Joubert, San Jose, CA (US); Ruediger Schmidt, Paderborn (DE); Holger Schneider, Ludwigshafen (DE); Klaus Leitner, Ludwigshafen (DE); Joern Kulisch, Eppelheim (DE)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 60 days.

(21) Appl. No.: 14/700,258

(22) Filed: Apr. 30, 2015

(65) Prior Publication Data

US 2015/0318539 A1 Nov. 5, 2015

Related U.S. Application Data

(60) Provisional application No. 61/987,271, filed on May 1, 2014.

(51) Int. Cl.
*H01M 4/136* (2010.01)
*H01M 4/134* (2010.01)
(Continued)

(52) U.S. Cl.
CPC ........... *H01M 4/136* (2013.01); *H01M 4/043* (2013.01); *H01M 4/0404* (2013.01);
(Continued)

(58) Field of Classification Search
CPC ...... H01M 4/136; H01M 4/134; H01M 4/382; H01M 4/5815; H01M 4/0404;
(Continued)

(56) References Cited

U.S. PATENT DOCUMENTS

| | | | |
|---|---|---|---|
| 5,336,571 A | * | 8/1994 | Tomantschger ........ H01M 4/50 429/145 |
| 2005/0169829 A1 | | 8/2005 | Dai et al. |

(Continued)

FOREIGN PATENT DOCUMENTS

| | | |
|---|---|---|
| DE | 10 2011 016 468 B3 | 2/2012 |
| WO | WO 2011/092149 A2 | 8/2011 |
| WO | WO 2012/165884 A2 | 12/2012 |

OTHER PUBLICATIONS

International Search Report and Written Opinion for Application No. PCT/EP2015/059479 mailed Jun. 25, 2015.
Second Written Opinion for Application No. PCT/EP2015/059479 mailed Mar. 31, 2016.
[No Author Listed] Porocarb® HD3—Porous Carbon for Electrochemistry Applications. Heraeus Brochure. Jun. 2013.
Affinito et al., Increasing Li-S Battery Life, and Improving Safety, through Application or a Variety of Coating Techniques. Society of Vacuum Coaters 54$^{th}$ Annual Technical Conference Proceedings. Apr. 16-21, 2011.
(Continued)

*Primary Examiner* — Jane Rhee
(74) *Attorney, Agent, or Firm* — Wolf, Greenfield & Sacks, P.C.

(57) ABSTRACT

Sulfur-based electrodes, and associated systems and methods for their fabrication, are generally described. Certain embodiments relate to sulfur-based electrodes with smooth external surfaces. According to some embodiments, relatively large forces can be applied to compositions from which the sulfur-based electrodes are made during the fabrication process. In some such embodiments, the compositions can maintain relatively high porosities, even after the relatively large forces have been applied to them. Methods in which liquids are employed during the electrode fabrication process are also described.

11 Claims, 6 Drawing Sheets

(51) Int. Cl.

| | | |
|---|---|---|
| *H01M 10/0525* | (2010.01) | |
| *H01M 4/38* | (2006.01) | |
| *H01M 4/58* | (2010.01) | |
| *H01M 4/04* | (2006.01) | |
| *H01M 4/139* | (2010.01) | |
| *H01M 4/62* | (2006.01) | |
| H01M 10/052 | (2010.01) | |
| H01M 4/02 | (2006.01) | |

(52) U.S. Cl.
CPC ........... *H01M 4/134* (2013.01); *H01M 4/139* (2013.01); *H01M 4/38* (2013.01); *H01M 4/382* (2013.01); *H01M 4/5815* (2013.01); *H01M 4/622* (2013.01); *H01M 4/625* (2013.01); *H01M 10/0525* (2013.01); *H01M 10/052* (2013.01); *H01M 2004/021* (2013.01)

(58) Field of Classification Search
CPC ........ H01M 4/043; H01M 4/139; H01M 4/38; H01M 4/622; H01M 4/625; H01M 10/0525; H01M 10/052; H01M 2004/021
See application file for complete search history.

(56) References Cited

U.S. PATENT DOCUMENTS

| | | | |
|---|---|---|---|
| 2005/0271940 A1 | 12/2005 | Fukunaga et al. | |
| 2011/0059361 A1* | 3/2011 | Wilkening ............ | H01M 4/136 429/218.1 |
| 2012/0301387 A1 | 11/2012 | Neumann | |
| 2013/0126803 A1 | 5/2013 | Giroud et al. | |
| 2014/0099536 A1 | 4/2014 | Sun et al. | |

OTHER PUBLICATIONS

Choi et al., Challenges facing lithium batteries and electrical double-layer capacitors. Angew Chem Int Ed Engl. Oct. 1, 2012;51(40):9994-10024. doi: 10.1002/anie.201201429. Epub Sep. 10, 2012.

Ding et al., Encapsulating sulfur into hierarchically ordered porous carbon as a high-performance cathode for lithium-sulfur batteries. Chemistry. Jan. 14, 2013;19(3):1013-9. doi: 10.1002/chem.201202127. Epub Nov. 23, 2012.

Kim et al., An Advanced Lithium-Sulfur Battery. Advanced Functional Materials. 2013;23:1076-80.

Rao et al., Porous carbon-sulfur composite cathode for lithium-sulfur batteries. Electrochemistry Communications. 2012;17:1-5.

Schuster et al., Spherical ordered mesoporous carbon nanoparticles with high porosity for lithium-sulfur batteries. Angew Chem Int Ed Engl. Apr. 10, 2012;51(15):3591-5. doi: 10.1002/anie.201107817. Epub Mar. 1, 2012.

Takeuchi et al., Preparation of electrochemically active lithium sulfide-carbon composites using spark-plasma-sintering process. Journal of Power Sciences. 2010;195:2928-34.

Wang et al., A microporous-mesoporous carbon with graphitic structure for a high-rate stable sulfur cathode in carbonate solvent-based Li-S batteries. Phys Chem Chem Phys. Jun. 28, 2012;10(24):8703-10. doi: 10.1039/c2cp40808b. Epub May 22, 2012.

Zhang et al., Confining sulfur in double-shelled hollow carbon spheres for lithium-sulfur batteries. Angew Chem Int Ed Engl. Sep. 17. 2012;51(38):9592-5. doi: 10.1002/anie.201205292. Epub Aug. 17, 2012.

* cited by examiner

ELECTRODE FABRICATION METHODS AND ASSOCIATED SYSTEMS AND ARTICLES

RELATED APPLICATIONS

This application claims priority under 35 U.S.C. §119(e) to U.S. Provisional Patent Application Ser. No. 61/987,271, filed May 1, 2014, and entitled "Electrode Fabrication Methods and Associated Systems and Articles," which is incorporated herein by reference in its entirety for all purposes.

TECHNICAL FIELD

The fabrication of electrodes, and associated systems and articles, are generally described.

BACKGROUND

Lithium-sulfur electrochemical cells typically include a sulfur-based electrode and a lithium-based electrode, which participate in an electrochemical reaction to produce electrical current. Generally, the lithium-sulfur electrochemical reactions are facilitated by an electrolyte, which can contain free ions and can behave as an ionically conductive medium.

One challenge associated with manufacturing sulfur-based electrodes for lithium-sulfur cells is imparting sufficient electrical conductivity to the electrode such that electrical current may be efficiently transported out of the sulfur-based electrode during the electrochemical operation of the cell. Many previous methods for fabricating sulfur-based electrodes have addressed this issue by adding an electrically conductive, carbon-based material—which has a substantially higher electrical conductivity than the electrode active sulfur-based material—to the electrode formulation. For example, many previous sulfur-based electrodes for lithium-sulfur electrochemical cells have been made by casting a suspension of a sulfur-based electrode active material, a carbon-based electrically conductive material, and a binder to form a layer that is subsequently dried to form the finished electrode. For a number of reasons, such electrodes can be challenging to incorporate into certain types of lithium-sulfur electrochemical cells. Accordingly, improved methods for fabricating sulfur-based electrodes are desired.

SUMMARY

Electrodes, and associated systems and methods for their fabrication, are generally described. The subject matter of the present invention involves, in some cases, interrelated products, alternative solutions to a particular problem, and/or a plurality of different uses of one or more systems and/or articles.

In one aspect, a method of making an electrode is described. In some embodiments, the method of making an electrode comprises applying a pressure of at least about 590 Newtons/cm$^2$ to a composition comprising a particulate electronically conductive material, an electrode active material, a binder, and a liquid wetting agent to form the electrode.

According to certain embodiments, the method of making an electrode comprises applying a pressure of at least about 1765 Newtons/cm$^2$ to a composition comprising a particulate electronically conductive material, an electrode active material, and a binder to form the electrode, wherein after the pressure has been applied to the composition, the electrode has a porosity of at least about 40%.

In one aspect, an electrode is described. In some embodiments, the electrode comprises a particulate electronically conductive material; an electrode active material; and a binder, wherein the electrode has a porosity of at least about 40%, and an external geometric surface of the electrode has a root mean square surface roughness of less than about 15 micrometers over a geometric surface area of at least about 10,000 square micrometers.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
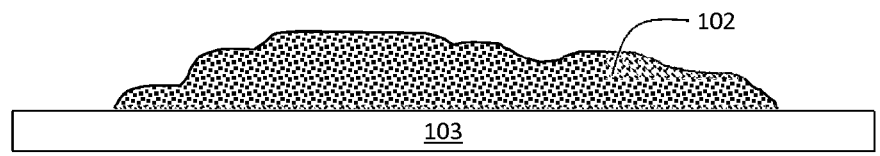
FIGS. 1A-1D are cross-sectional schematic diagrams illustrating the fabrication of an electrode, according to certain embodiments.

Electrodes, and associated systems and methods for their fabrication, are generally described. Certain embodiments relate to electrodes comprising particulate electronically conductive material (e.g., including but not limited to sulfur-based electrodes) with smooth external surfaces. According to some embodiments, relatively large forces can be applied, during the electrode fabrication process, to precursor compositions from which the electrodes are made. In some such embodiments, the compositions can maintain relatively high porosities, even after the relatively large forces have been applied to them during the fabrication process. Methods in which liquids are employed during the electrode fabrication process (and, in particular, during the application of relatively high pressures) are also described.

The application of force during the charge and/or discharge of lithium-based electrochemical cells (as opposed to the application of force during the formation of the electrode(s) of the electrochemical cell, described above) has been shown to enhance cell performance. As one example, U.S. Patent Publication No. 2010/0035128 to Scordilis-Kelley et al. filed on Aug. 4, 2009, entitled "Application of Force in Electrochemical Cells," describes the application of forces in electrochemical cells during charge and/or discharge for improved electrode chemistry, morphology, and/or other characteristics, which can improve performance. Some electrochemical cells may undergo a charge/discharge cycle involving stripping and deposition of metal on the surface of an electrode (e.g., stripping and deposition of lithium metal on the surface of a lithium anode). In some cases, the stripping and deposition can be accompanied by parasitic reactions of the metal on the electrode surface with other cell components, such as electrolyte components. One or more surfaces of the electrode may become uneven as the electrochemical cell undergoes repeated charge/discharge cycles, often due to uneven re-deposition of an ion dissolved in the electrolyte. The roughening of one or more surfaces of an electrode can result in increasingly poor cell performance.

One way to combat the adverse impact of uneven re-deposition of electrode active material is to apply an anisotropic force to the affected electrode during charge and/or discharge. However, applying an anisotropic force to an electrochemical cell can adversely affect the performance of the electrochemical cell separator, in certain instances. For example, if sufficiently large forces are applied to an electrochemical cell during charge and discharge, and one or both electrodes in the electrochemical cell have relatively rough external surfaces, the rough electrode(s) may penetrate the electronically insulating separator (e.g., a polymeric separator) between the anode and the cathode, leading to a short circuit of the cell. If, on the other hand, the electrodes within the electrochemical cell are smooth, anisotropic forces can often be applied to the cell during charge and/or discharge without breaching the separator, and thus, without adversely impacting cell performance.

As noted above, the performance of electrodes comprising certain electrode active materials (including electrode active materials with relatively low electronic conductivities, such as sulfur) can be enhanced by including particulate electronically conductive additives, such as carbon. Making such electrodes smooth while maintaining sufficient electrode porosity to allow for interaction between the electrode active material and the electrolyte within the electrochemical cell can be challenging.

Certain aspects described herein are related to systems and methods that can be used to produce smooth electrodes that contain particulate electronically conductive material. Such systems and methods can, according to certain embodiments, allow one to fabricate an electrode using relatively non-conductive electrode active materials (e.g., sulfur) while maintaining sufficient smoothness to ensure that the cell produces a useful amount of electronic current (and, for example, does not fail due to separator failure) during operation. It has been unexpectedly found, according to certain embodiments, that very smooth electrodes can be produced by applying large compressive forces to the electrode composition during the electrode fabrication process. It was expected that application of such forces during electrode fabrication would greatly reduce (or eliminate) the porosity of the resulting electrode composition, for example, by crushing or otherwise structurally compromising the porous material such that the porosity is greatly reduced or eliminated. The reduction or elimination of porosity would be detrimental to the performance of the resulting electrode within an electrochemical cell, as it would not allow for sufficient interaction between the electrolyte and the electrode active material. It was unexpectedly found, however, that when using particulate electronically conductive materials that possess certain properties, electrode porosity can be maintained while achieving the desired level of smoothness.

Certain aspects relate to methods of making electrodes. FIGS. 1A-1D are cross-sectional schematic illustrations of an exemplary method of electrode fabrication. In certain embodiments, the method comprises applying pressure, during the electrode fabrication process, to a composition comprising a particulate electronically conductive material and an electrode active material. Referring to FIG. 1A, composition 102 can be provided. Composition 102 can comprise an electrode active material and a particulate electronically conductive material. Composition 102 can also comprise a binder, such as a polymeric binder.

Figure 1B:
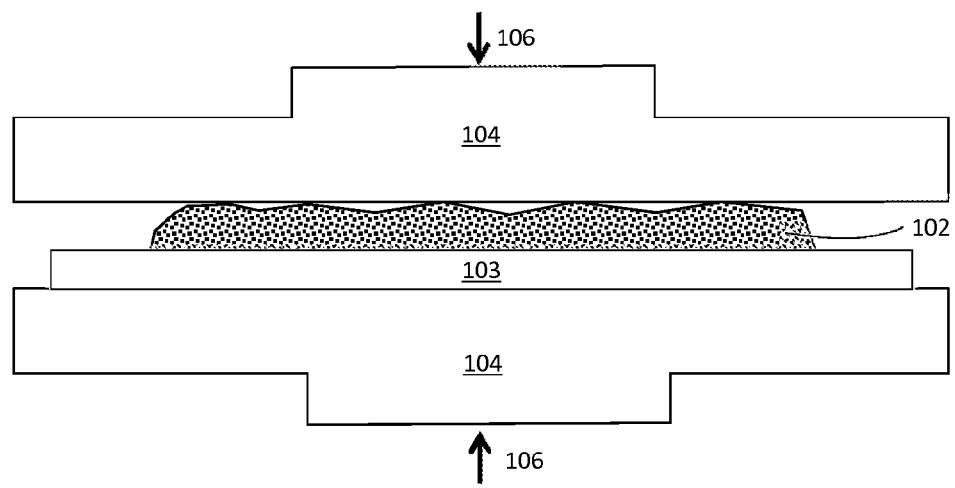
Figure 1C:
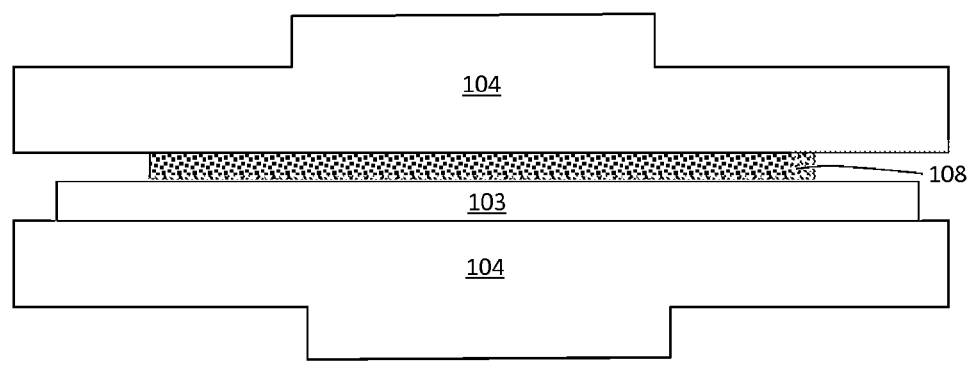
Figure 1D:
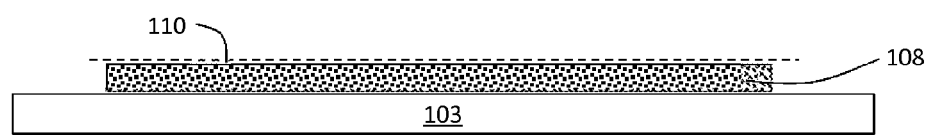

According to certain embodiments, the composition used to form the electrode can be formed on a substrate (e.g., cast or otherwise deposited onto a current collector) prior to applying the relatively large compressive force to the composition to form the electrode. For example, composition 102 in FIG. 1A can first be formed over substrate 103 (which can be a current collector) prior to a compressive force being applied to the composition (as illustrated in FIGS. 1B-1C, and described in more detail below) to form the electrode. The use of a current collector or other substrate is optional, and in some embodiments, the electrode composition can be deposited directly on the device used to apply the compressive force to the composition.

The electrode active material within the composition can be in particulate form or in any other form suitable for forming electrodes via the application of pressure. A variety of types of electrode active material suitable for use are described in more detail below. As one non-limiting example, the electrode active material can be a sulfur containing material, such as elemental sulfur.

Composition 102 can also comprise a particulate electronically conductive material. The particulate electronically conductive material can be used to impart electronic conductivity to the composition. In certain instances, the other components of the composition may not be sufficiently electronically conductive to provide a pathway for electrons to exit during discharge of the electrochemical cell using the electrode. In some such cases, when the particulate electronically conductive material is included in the electrode precursor composition, the resulting electrode can be sufficiently electronically conductive to provide a pathway for electrons to enter and/or leave the electrode. A variety of types of particulate electronically conductive materials can be used in association with the systems and methods described herein, as described in more detail below. As one non-limiting example, the particulate electronically conductive material can comprise carbon, such as carbon black. In some embodiments, the carbon may be relatively hard and/or capable of withstanding relatively high applied pressures, as described in more detail below. For example, in certain, but not necessarily all embodiments, the use of Porocarb® porous carbons (manufactured by Heraeus Quarzglas GmbH & Co., Kleinostheim, Germany), such as Porocarb® HD3, can be advantageous. According to certain embodiments, the particulate electronically conductive material is porous, as described in more detail elsewhere herein. In certain embodiments, the conductive additive can include graphitic carbon (e.g., graphite and/or graphene), which can, according to certain embodiments, help maintain smoothness of the electrode when pressure is applied.

Composition 102 can also include other components. For example, in certain embodiments, the composition comprises at least one binder. The binder can be, for example, a polymeric binder, such as polyvinyl alcohol. Other suitable binders for use in electrode precursor composition are described in more detail elsewhere herein.

In certain embodiments, pressure is applied to the electrode precursor composition. Pressure can be applied to the electrode precursor composition to form the electrode using any suitable method. Referring back to FIG. 1B, composition 102 has been placed within a press including press plates 104. Pressure can be applied to composition 102 by moving plates 104 in the direction of arrows 106. This can result in the application of compressive force to composition 102. As illustrated in FIG. 1C, applying the compressive force to composition 102 can flatten composition 102 to produce relatively flat and smooth electrode 108.

According to certain embodiments, the magnitude of the pressure applied to the composition during fabrication of the electrode can be relatively large. Applying relatively large pressures to the electrode precursor compositions described herein can result in the formation of a relatively smooth electrode. As described elsewhere, the use of relatively smooth electrodes can be advantageous, for example, in electrochemical cells in which an isotropic force is applied during charge and/or discharge. Accordingly, some embodiments comprise applying a pressure of at least about 590 Newtons/cm$^2$, at least about 750 Newtons/cm$^2$, at least about 1000 Newtons/cm$^2$, or at least about 1765 Newtons/cm$^2$ to the composition to form the electrode. Some embodiments comprise applying a pressure of at least about 590 Newtons/cm$^2$ and up to about 6000 Newtons/cm$^2$, or at least about 1765 Newtons/cm$^2$ and up to about 6000 Newtons/cm$^2$ to the composition to form the electrode. Of course it should be understood that in other embodiments, pressures that lie below and/or above these ranges can also be used to form electrodes.

In certain embodiments, an optional liquid wetting agent can be employed during the step of applying the pressure to the electrode precursor composition to form the electrode. For example, referring back to FIG. 1A, composition 102 can include a liquid wetting agent. In was unexpectedly discovered, according to certain embodiments, the use of liquid wetting agents can be particularly useful in producing smooth electrodes when large pressures are applied to electrode precursor compositions, such as composition 102 in FIG. 1A. Without wishing to be bound by any particular theory, it is believed that the presence of the liquid wetting agent aides in the settling of the particulate material within the electrode precursor composition to produce a relatively smooth external surface. In addition, it is believed that the presence of the liquid wetting agent leads to plasticization of the binder, which can allow for reflow of the cathode matrix. It was expected that the use of such liquid wetting agents would lead to cracking any other discontinuities within the finally formed electrode. However, it was discovered that such liquid wetting agents could be used, particularly under high applied pressures, while the formation of cracks and other discontinuities in the electrode was limited and/or avoided.

A variety of types of liquid wetting agents can be used in association with the systems and methods described herein. In some embodiments, the liquid wetting agent comprises an aqueous and/or non-aqueous fluid. Suitable types of liquid wetting agents include, but are not limited to, water, alcohols (e.g., isopropyl alcohol, methanol, ethanol, propanol, and/or butanol), tetrahydrofuran, dimethoxyethane, acetone, toluene, xylene, acetonitrile, cyclohexane and the like. In certain embodiments, the liquid wetting agent comprises a mixture of water and isopropyl alcohol. In some such embodiments, the ratio of water to isopropyl alcohol is from 1:4 to about 4:1, from about 1:2 to about 2:1, from about 1:1.5 to about 1.5:1, or from about 1:1.1 to about 1:1.1.

One or ordinary skill in the art, in view of the present disclosure, would be capable of selecting appropriate wetting agents (and their relative amounts). In some cases, it may be desirable to select one or more wetting agents that are capable of plasticizing the binder used in the electrode fabrication process to a sufficient degree to allow the electrode components to flow.

In certain embodiments, the liquid wetting agent can make up a relatively high weight percentage of the electrode precursor composition when the pressure is applied to the electrode precursor composition. For example, in certain embodiments, the liquid wetting agent makes up at least about 1 wt %, at least about 5 wt %, at least about 10 wt %, at least about 20 wt %, at least about 40 wt % (and/or, in certain embodiments, up to about 60 wt %, or more) of the electrode precursor composition to which pressure is applied, at a point just before the pressure is applied to the electrode precursor composition. In certain embodiments, after compression of the electrode precursor composition has been performed, but prior to drying the electrode precursor composition, the wetting agent can make up at least about 1 wt %, at least about 5 wt %, at least about 10 wt % (and/or, in certain embodiments, up to about 40 wt %, or more) of the resulting composition.

According to certain embodiments, the process of forming the electrode comprises at least partially removing the liquid wetting agent from the electrode precursor composition. For example, in some embodiments, after pressure (e.g., of at least about 590 Newtons/cm$^2$, or within any of the other ranges outlined above) has been applied to the electrode precursor composition, the liquid wetting agent can be at least partially removed to leave behind a relatively dry electrode. Removing at least a portion of the liquid wetting agent can be achieved, for example, by drying the compressed electrode precursor, optionally in a heated environment (e.g., within an oven). In certain embodiments, removing at least a portion of the liquid wetting agent from the electrode precursor composition comprises removing at least about 50 wt %, at least about 75 wt %, at least about 90 wt %, at least about 95 wt %, or at least about 99 wt % of the liquid wetting agent from the electrode precursor composition.

In some embodiments, the electrodes described herein (and/or the porous support structures within the electrode described herein) can maintain a relatively high degree of porosity, even after relatively large pressures have been applied to the electrode precursor compositions from which the electrodes are formed. It has unexpectedly been discovered that the application of such relatively large forces can be used to form electrodes without damaging the material from which the electrode is formed. It was expected that the application of large forces to electrode precursor compositions would fracture or otherwise mechanically deform the material within the electrode precursor composition, such as the particulate electronically conductive material. By using certain types of particulate electronically conductive materials, one can avoid the mechanical breakdown of such materials, which can allow for the application of large pressures. Not wishing to be bound by any particular theory, it is believed that it can be advantageous, in certain although not necessarily all embodiments, to use particulate electronically conductive materials having relatively large amounts of internal porosity (i.e., intraparticle porosity) and external shapes that lead to a relatively small amount of porosity between the particles (i.e., interparticle porosity) when the particles are agglomerated. It is believed that the use of such particles can allow the final electrode to maintain its overall porosity even when large pressures are applied (which, in other systems, could lead to the shifting of the particles, reducing the interparticle porosity and thus, the overall porosity). In certain embodiments, the use of porous particles having pore sizes larger than 0.1 micrometers is believed to impart further structural stability to the resulting electrode, allowing for the application of relatively large pressures during the fabrication process.

It is also believed that the use of porous particulate electronically conductive material that is relatively hard and stable under pressure can allow one to maintain the final porosity of the electrode after relatively large pressures have been applied during the electrode fabrication process. Such pressure-resistant porous particulate electronically conductive materials may be formed, according to certain embodiments, using a templating process in which a sacrificial material is combined with a second material, after which the sacrificial material is removed from the combination. In some cases, the structure of the second material can be substantially maintained after the sacrificial material has been removed from the combination.

For example, in some embodiments, the porous particulate electronically conductive material can be made by assembling a plurality of templating elements made of a sacrificial material into a template. In some such embodiments, a second material can be mixed with the templating elements. The second material comprises, in some embodiments, a material from which the porous particulate electronically conductive material is to be made (e.g., a carbon-based material). In certain embodiments, the second material comprises a precursor of the porous particulate electronically conductive material, which might be converted to form the porous particulate electronically conductive material via, for example, a reaction (e.g., pyrolysis of a hydrocarbonaceous material). The templating elements can, in certain embodiments, be arranged such that they form an interconnected network, and the second material can be transported into the interstices of the network. After the templating elements have been arranged within the second material, they can be removed from the mixture to leave behind pores within a porous particulate electronically conductive material. Porocarb® porous carbons (manufactured by Heraeus Quarzglas GmbH & Co., Kleinostheim, Germany), such as Porocarb® HD3, are exemplary porous particulate electronically conductive materials made using such a process.

The ability to maintain porosity of an electrode (and/or of a porous support structure used to make an electrode) after the application of relatively large forces during the electrode fabrication process can allow one, according to certain embodiments, to form electrodes that are both relatively smooth and highly porous. As noted elsewhere, smooth electrodes can be useful in enhancing electrochemical cell performance when an isotropic force is applied during charge and/or discharge of the electrochemical cell. In addition, highly porous electrodes can be desirable in certain instances as they can provide for a relatively high degree of interaction between the electrode active material and the electrolyte, which can be important for effective cell performance.

As used herein, a "pore" refers to a conduit, void, or passageway, at least a portion of which is surrounded by the medium in which the pore is formed. Generally, voids within a material that are completely surrounded by the material (and thus, not accessible from outside the material, e.g. closed cells) are not considered pores within the context of the invention. It should be understood that, in cases where porous object comprises an agglomeration of particles, pores include both the interparticle pores (i.e., those pores defined between particles when they are packed together, e.g., interstices) and intraparticle pores (i.e., those pores lying within the external geometric surfaces of the individual particles). Pores may comprise any suitable cross-sectional shape including irregular shapes and regular shapes (e.g., substantially circular shapes, substantially elliptical shapes, substantially polygonal shapes, and the like).

In certain embodiments, after the pressure has been applied to the composition, the electrode has a porosity of at least about 40%. In certain embodiments, after the pressure has been applied to the composition, the electrode has a porosity of at least about 50% or at least about 60% (and/or, in some embodiments, up to about 70%, or more). In some embodiments, after the pressure has been applied to the composition, the electrode has a porosity of at least about 40% and up to about 70%. The porosity of an electrode, when expressed as a percentage, corresponds to the percentage of the electrode's geometric volume that is occupied by void volume. The void volume within an electrode refers to the porous portion of an electrode that is not occupied by electrode active material (e.g., sulfur), conductive material (e.g., carbon, metal, etc.), binder, or other materials that provide structural support, as measured when the electrode active material is present within the electrode (i.e., after compression of the electrode) and the electrode is fully charged. The void volume of an electrode generally includes the volume of the pores in the particles from which the electrode is formed, as well as interstices between the particles. Void volume may be occupied by electrolyte (when the electrode is in use), gases, and/or other non-electrode materials. One of ordinary skill in the art would be capable of determining the void volume within an electrode by performing, for example, mercury intrusion porosimetry according to ASTM Standard Test D4284-07, which is incorporated herein by reference in its entirety for all purposes. The final percentage porosity can then be calculated by dividing the void volume of the electrode by the geometric volume of the electrode (e.g., calculated by measuring the size of the electrode using macroscopic measurement techniques).

In certain embodiments, the porosity of a porous support structure within the electrode is relatively large. For example, in some embodiments, the porous support structure within the electrode has a porosity of at least about 40%, at least about 50%, at least about 60%, or at least about 70% (and/or, in some embodiments, up to about 80%, or more). The "porous support structure" of an electrode refers to the portions of the electrode that are not occupied by gases (e.g., air), liquid, and electrode active material. The porosity of a porous support structure can be determined by removing the electrode active material from the electrode, and performing mercury intrusion porosimetry according to ASTM Standard Test D4284-07. The final percentage porosity of the porous support structure can then be calculated by dividing the geometric volume of the porous support structure (e.g., calculated by measuring the size of the porous support structure using macroscopic measurement techniques) by the void volume of the porous support structure.

In certain embodiments, the systems and methods described herein can be used to produce electrodes with relatively smooth external geometric surfaces. As used herein, the "external geometric surface" of an object refers to the surface defining the outer boundaries of the object when analyzed at substantially the same scale as the maximum cross-sectional dimension of the object. Generally, the external geometric surface of an object does not include the internal surfaces, such as the surfaces defined by pores within a porous object. As one non-limiting example, electrode 108 comprises external geometric surface 110. The surfaces of the pores within electrode 108, on the other hand, do not constitute external geometric surfaces of electrode 108.

In certain embodiments, an external geometric surface of the electrode has a root mean square (RMS) surface roughness of less than about 15 micrometers, less than about 10 micrometers, less than about 5 micrometers, less than about 1 micrometer, or less than about 0.5 micrometers over a geometric surface area of at least about 10,000 square micrometers (and/or in some embodiments, over a geometric surface area of at least about 100,000 square micrometers, at least about 1,000,000 square micrometers, at least about 10,000,000 square micrometers, at least about 1 square centimeter, and/or up to about 10 square centimeters, up to about 100 square centimeters, or more). In certain embodiments, an external geometric surface of the electrode has a root mean square surface roughness of from about 0.1 micrometers to about 15 micrometers, from about 0.1 micrometers to about 10 micrometers, from about 0.1 micrometers to about 5 micrometers, from about 0.1 micrometers to about 1 micrometer, or from about 0.1 micrometers to about 0.5 micrometers over a geometric surface area of at least about 10,000 square micrometers (and/or in some embodiments, over a geometric surface area of at least about 100,000 square micrometers, at least about 1,000,000 square micrometers, at least about 10,000,000 square micrometers, at least about 1 square centimeter, and/or up to about 10 square centimeters, up to about 100 square centimeters, or more). In certain embodiments, an external geometric surface of the electrode has a root mean square surface roughness of from about 0.1 micrometers to about 15 micrometers, from about 0.1 micrometers to about 10 micrometers, from about 0.1 micrometers to about 5 micrometers, from about 0.1 micrometers to about 1 micrometer, or from about 0.1 micrometers to about 0.5 micrometers when sampled over a geometric surface area of about 250,000 square micrometers. Those of ordinary skill in the art would be familiar with RMS surface roughness, which is a descriptor for the standard deviation of the distribution of surface heights. The RMS surface roughness is calculated as the average between the height deviations and the mean line/surface, taken over the evaluation area. The RMS surface roughness mean line is the line that divides the profile so that the sum of the squares of the deviations of the profile height from it is equal to zero. RMS surface roughness ($R_q$) is calculated as follows:

$$R_q = \sqrt{\frac{1}{N}\sum_{i=1}^{N} Z^2} \quad [1]$$

where Z is the surface height relative to the mean plane and N is the number of points at which Z is measured. To calculate $R_q$ over a given geometric surface area, the surface height is measured at 1.227 points per square micrometer, such measurements distributed spatially evenly across the measured surface area. Generally, the RMS surface roughness of a given electrode is determined by examining the electrode an 11× magnification. Example 1 describes an exemplary experimental determination of the RMS surface roughness of the external geometric surface of an electrode, according to one embodiment.

In certain embodiments, the resulting electrode can be relatively thin. For example, according to certain embodiments, after pressure has been applied to the electrode composition, the resulting electrode can be in the form of a thin film. In some embodiments, the thickness of the electrode is less than or equal to about 1 mm, less than or equal to about 100 micrometers, or less than or equal to about 50 micrometers. According to certain embodiments, the thickness of the electrode is at least about 10 micrometers and less than or equal to about 1 mm, at least about 10 micrometers and less than or equal to about 100 micrometers, or at least about 10 micrometers and less than or equal to about 50 micrometers.

In addition to inventive electrode fabrication processes, inventive electrodes are also described. Certain of the inventive electrodes are obtainable using any of the methods described elsewhere herein. An example of one such inventive electrode is illustrated, for example, in FIG. 1D.

Certain of the inventive electrodes can include any of the materials described elsewhere herein. The electrode can comprise, for example, a particulate electronically conductive material (which may be porous) and an electrode active material (such as, for example, sulfur). The electrode can comprise, in certain embodiments, a binder, such as a polymeric binder. In addition, the inventive electrodes can also have any of the electrode properties described elsewhere herein, including porosity, smoothness, pore size distribution, and/or any of the other properties described elsewhere herein.

A variety of materials can be used as the particulate electronically conductive material. In some embodiments, the particulate electronically conductive material can be a carbon-based material, such as carbon black. Other exemplary particulate electronically conductive materials that can be used to form all or part of the particles within the porous support structures described herein include, but are not limited to, metals (e.g., nickel, copper, magnesium, aluminum, titanium, scandium, iron, alloys and/or other combinations of these), conductive polymers (poly(3,4-ethylenedioxythiphene) (PEDOT), poly(methylenedioxythiophene) (PMDOT), other thiophenes, polyaniline (PANI), polypyrrole (PPy)), and the like.

In one particular set of embodiments, the particulate electronically conductive material comprises Porocarb® porous carbons (manufactured by Heraeus Quarzglas GmbH & Co., Kleinostheim, Germany), such as Porocarb® HD3.

In certain embodiments, the particulate electronically conductive material has a bulk electronic resistivity of less than about $10^{-3}$ ohm-m, less than about $10^{-4}$ ohm-m, less than about $10^{-5}$ ohm-m, or less than about $10^{-7}$ ohm-m at 20° C. In certain embodiments, at least about 50 wt %, at least about 75 wt %, at least about 90 wt %, at least about 95 wt %, or at least about 99 wt % of the particulate electronically conductive material has a bulk electrical resistivity of less than about $10^{-3}$ ohm-m, less than about $10'$ ohm-m, less than about $10^{-5}$ ohm-m, or less than about $10^{-7}$ ohm-m at 20° C.

In certain embodiments, the effective bulk resistivity of the electrode after the material has been compressed and dried (including the binder, the particulate electronically conductive material, and the electrode active material) is from about $10^{-3}$ ohm-m to about 10 ohm-m. The effective bulk resistivity of an electrode can be determined by measuring the resistance across the electrode (which has known dimensions). Using this resistance measurement, the effective electronic conductivity of the electrode can then be back calculated using the geometry across which the resistance was measured. Generally, the effective bulk resistivity is calculated as:

$$\text{Resistivity}_{\text{effective bulk}} = \frac{A \cdot R}{l} \quad [2]$$

wherein A is the cross-sectional area of the electrode orthogonal to the length along which the resistance measurement is made, R is the measured resistance value, and l is the length along which the resistance measurement is made.

The particulate electronically conductive material may have any suitable particle size distribution. In some embodiments, the particulate electronically conductive material used to form the electrodes described herein can have maximum cross-sectional dimensions within a designated range. For example, in some cases, at least about 50%, at least about 75%, at least about 90%, at least about 95%, or at least about 99%, or substantially all of the total volume of the particulate electronically conductive material within an electrode can be made up of particles having maximum cross-sectional dimensions of between about 0.1 micrometers and about 45 micrometers, between about 0.1 micrometers and about 10 micrometers, between about 1 micrometer and about 10 micrometers, or between about 1 micrometer and about 3 micrometers. In some embodiments, the particles used to form a porous support structure can have an average maximum cross-sectional dimension of between about 0.1 micrometers and about 45 micrometers, between about 0.1 micrometers and about 10 micrometers, between about 1 micrometer and about 10 micrometers, or between about 1 micrometer and about 3 micrometers.

The "maximum cross-sectional dimension" of an article (e.g., a particle, an electrode, etc.) refers to the largest distance between two opposed boundaries of the article that may be measured. One of ordinary skill in the art would be capable of measuring the maximum cross-sectional dimension distributions of a particulate electronically conductive material by examining scanning electron microscope (SEM) images of the particulate material.

The "maximum external surface cross-sectional dimension" of a pore or other indentation in a particle is the largest dimension between two points of the pore or other feature measured along the geometric surface of the particle. For example, for a 10-micrometer diameter cylindrical pore that extends through the center of a 1 millimeter spherical particle (resulting in a pore with a length of 1 millimeter), the maximum surface cross-sectional dimension of the pore would be 10 micrometers.

The distribution of the cross-sectional diameters of the pores within a given porous support structure and/or within the assembled electrode can be chosen to enhance the performance of the electrochemical cell. As used herein, the "cross-sectional diameter" of a pore refers to a cross-sectional diameter as measured using ASTM Standard Test D4284-07, which is incorporated herein by reference in its entirety. The "average cross-sectional diameter" of a plurality of pores refers to the number average of the cross-sectional diameters of each of the plurality of the pores. One of ordinary skill in the art would be capable of calculating the distribution of cross-sectional diameters and the average cross-sectional diameter of the pores within a porous structure (e.g., a small-scale porous support structure, a large scale porous support structure, and electrode assembled from a combination of porous support structures) using mercury intrusion porosimetry as described in ASTM Standard Test D4284-07. For example, the methods described in ASTM Standard Test D4284-07 can be used to produce a distribution of pore sizes plotted as the cumulative intruded pore volume as a function of pore diameter. To calculate the percentage of the total pore volume within the sample that is made up of pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM Standard Test D4284-07, porosimetry measurements may be supplemented using Brunauer-Emmett-Teller (BET) surface analysis, as described, for example, in S. Brunauer, P. H. Emmett, and E. Teller, *J. Am. Chem. Soc.*, 1938, 60, 309, which is incorporated herein by reference in its entirety.

In certain embodiments, a porous support structure and/or an assembled electrode can be configured to comprise pores with cross-sectional diameters that are larger than sub-nanometer scale and single nanometer scale pores, which can be relatively easily clogged with electrochemical cell reaction by-product and/or can be too small to allow for the passage of electrolyte (e.g., liquid electrolyte) into the pores of the electrode due to, for example, capillary forces. In addition, in some cases, the pores within a porous support structure and/or within an assembled electrode may have cross-sectional diameters that are smaller than millimeter-scale pores, which may be so large that they render the electrode mechanically unstable.

In some embodiments, the total pore volume of a porous structure is described. In such embodiments, the porous support structure can be said to comprise a plurality of pores, wherein each pore of the plurality of pores has a pore volume, and the plurality of pores has a total pore volume defined by the sum of each of the individual pore volumes. In certain embodiments, at least about 50%, at least about 75%, at least about 90%, at least about 99%, or substantially all of the total pore volume within the assembled electrode is defined by pores having cross-sectional diameters of between about 0.1 micrometers and about 10 micrometers, or between about 1 micrometer and about 3 micrometers. In some embodiments, the average cross-sectional diameter of the pores within the assembled electrode is between about 0.1 micrometers and about 10 micrometers, or between about 1 micrometer and about 3 micrometers.

Generally, the porosity (e.g., distribution of pores, distribution of pore sizes, void volume, etc.) of an assembled electrode is determined in the absence of electrode active material within the pores of the electrode. This can be achieved, for example, by removing the electrode active material from the pores of the electrode and subsequently performing mercury intrusion porosimetry and/or by performing porosimetry before electrode active material has been added to the electrode.

In some embodiments, the assembled electrode may comprise pores with relatively uniform cross-sectional diameters. Not wishing to be bound by any theory, such uniformity may be useful in maintaining relatively consistent structural stability throughout the bulk of the porous electrode. In addition, the ability to control the pore size to within a relatively narrow range can allow one to incorporate a large number of pores that are large enough to allow for fluid penetration (e.g., electrolyte penetration) while maintaining sufficiently small pores to preserve structural stability. In some embodiments, the distribution of the cross-sectional diameters of the pores within an assembled electrode can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n} (D_i - D_{avg})^2}{n-1}} \quad [3]$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

In certain embodiments, an electrode active material can be substantially contained within pores of the porous support structures described herein. The electrode active material can be added to form electrodes using the porous support structure. A first material that is said to be "substantially contained" within the pores of a second material is one that at least partially lies within the imaginary volumes defined by the outer boundaries of the pores of the second material. For example, a material substantially contained within a pore can be fully contained within the pore, or may only have a fraction of its volume contained within the pore, but a substantial portion of the material, overall, is contained within the pore. In certain embodiments, a first material (e.g., an electrode active material) is at least partially contained within the pores of a second material (e.g., a porous support structure) when at least about 30 wt %, at least about 50 wt %, at least about 70 wt %, at least about 80 wt %, at least about 85 wt %, at least about 90 wt %, at least about 95 wt %, or substantially all of the first material lies within the imaginary volume defined by the outer boundaries of the pores of the second material.

Figure 2:
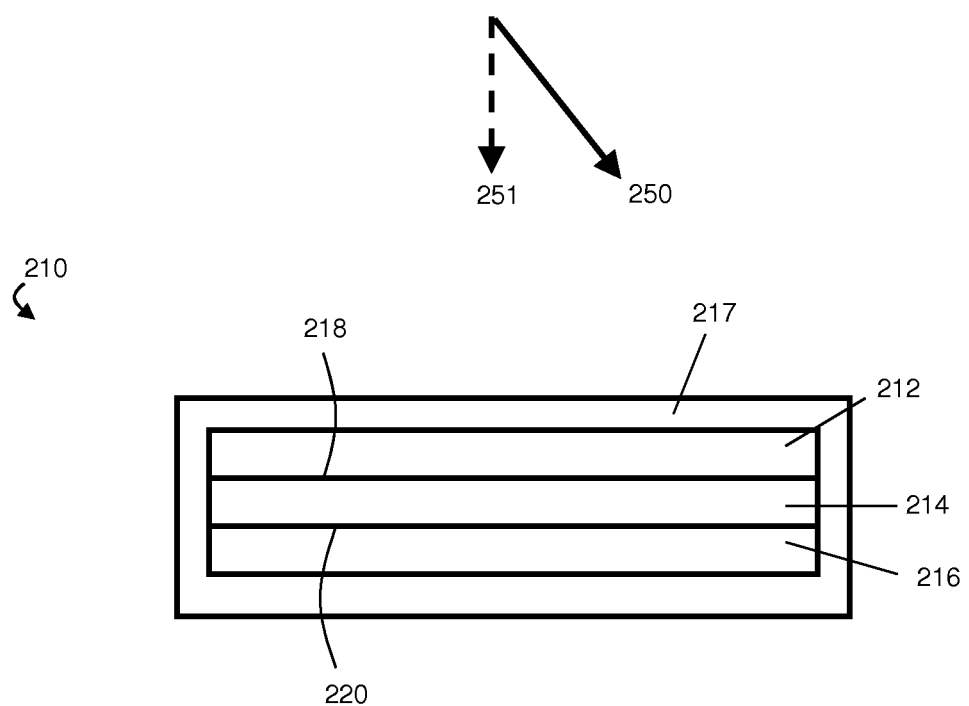
FIG. 2, is a cross-sectional schematic diagram of an electrochemical cell, according to some embodiments.

Although the present invention can find use in a wide variety of electrochemical devices, an example of one such device is provided in FIG. 2 for illustrative purposes only. FIG. 2 includes a schematic illustration of an electrochemical cell 210 comprising a cathode 212 and an anode 216. In addition, the electrochemical cell comprises electrolyte 214 (which can include a separator). The electrolyte can include one or more components in electrochemical communication with the cathode and the anode. While the anode, cathode, and electrolyte in FIG. 2 are shown as having a planar configuration, other embodiments may include non-planar configurations (e.g., cylindrical, serpentine, etc.). In the set of embodiments illustrated in FIG. 2, electrochemical cell 210 also includes a housing structure 217.

The electrochemical cell can comprise an electrode that is obtained using any of the methods described elsewhere herein. For example, referring to FIG. 2, in some embodiments, cathode 212 can be made using any of the electrode fabrication techniques described herein. Cathode 212 can be made, for example, by applying a pressure (e.g., within any of the ranges described elsewhere herein) to a composition comprising a particulate electronically conductive material, an electrode active material, and a binder (and/or, according to some embodiments, a liquid wetting agent). Cathode 212 can also have any of the electrode properties described elsewhere herein. For example, in some embodiments, cathode 212 has a porosity of at least about 40%. In certain embodiments, cathode 212 has an external geometric surface with a root mean square surface roughness of less than about 15 micrometers over a geometric surface area of at least about 1 cm$^2$ (and/or in some embodiments, over a geometric surface area of at least about 10 cm$^2$ and/or up to about 100 cm$^2$, or more).

According to certain embodiments, the electrochemical cell comprises a second electrode comprising lithium (e.g., lithium metal and/or a lithium alloy). For example, in FIG. 2, anode 216 can comprise a lithium-based electrode active material, according to certain embodiments.

Of course, the orientation of the components can be varied, and it should be understood that there are other embodiments in which the orientation of the layers is varied. Additionally, non-planar arrangements, arrangements with proportions of materials different than those shown, and other alternative arrangements are useful in connection with the present invention. A typical electrochemical cell also would include, of course, current collectors, external circuitry, and the like. Those of ordinary skill in the art are well aware of the many arrangements that can be utilized with the general schematic arrangement as shown in the figures and described herein.

Electrodes comprising the particulate electronically conductive materials and electrode active materials described herein (including, for example, the relatively smooth electrodes described herein) can be used as anodes and/or cathodes. In certain embodiments, cathode 212 of electrochemical cell 210 can be relatively smooth and/or have any of the other electrode properties described herein. In some such embodiments, anode 216 comprises lithium (e.g., lithium metal and/or a lithium alloy) as an active species. For example, anode 216 can comprise a lithium metal foil, in certain embodiments.

As noted elsewhere, it can be advantageous, according to certain embodiments, to use certain of the electrodes described herein in electrochemical cells in which an anisotropic force is applied during charge and/or discharge (although the electrodes may also be used in other types of electrochemical cells). In certain embodiments, the electrochemical cells and/or the electrodes described herein can be configured to withstand an applied anisotropic force (e.g., a force applied to enhance the morphology of an electrode within the cell) while maintaining their structural integrity (including void volume, in certain embodiments). In certain embodiments, any of the electrodes described herein can be part of an electrochemical cell that is constructed and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In one set of embodiments, the applied anisotropic force can be selected to enhance the morphology of an electrode (e.g., an anode such as a lithium metal and/or a lithium alloy anode), and the cathode can comprise a particulate electronically conductive material and an electrode active material. In some such embodiments, the cathode can be relatively smooth, for example, having a surface roughness within any of the ranges described elsewhere herein.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

In certain such cases, the anisotropic force comprises a component normal to an active surface of an electrode within an electrochemical cell. As used herein, the term "active surface" is used to describe a surface of an electrode that is in physical contact with the electrolyte and at which electrochemical reactions may take place. For example, referring back to FIG. 2, cathode 212 can include cathode active surface 218 and/or anode 216 can include anode active surface 220. One of ordinary skill in the art would understand that an active surface of an electrode refers to an external geometric surface of the electrode.

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

An applied force with a component normal to an active surface of an electrode is illustrated in FIG. 2. In FIG. 2, an anisotropic force may be applied in the direction of arrow 250. Arrow 251 illustrates the component of force 250 that is normal to active surface 220 of anode 216 (and also, in this case, normal to active surface 218 of cathode 212). In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode. In some embodiments, the anisotropic force is applied uniformly over the active surface of the anode.

Any of the electrode properties (e.g., low surface roughness, porosity, pore size distribution, etc.) and/or performance metrics described herein may be achieved, alone or in combination with each other, while an anisotropic force is applied to the electrochemical cell (e.g., during charge and/or discharge of the cell) during charge and/or discharge. In certain embodiments, the anisotropic force applied to porous support structure, to the electrode, and/or to the electrochemical cell containing the electrode (e.g., during at least one period of time during charge and/or discharge of the cell) can include a component normal to an active surface of an electrode (e.g., an anode such as a lithium metal and/or lithium alloy anode within the electrochemical cell and/or the porous electrode comprising multiple porous support structures). In certain embodiments, the component of the anisotropic force that is normal to the active surface of the electrode defines a pressure of at least about 20, at least about 25, at least about 35, at least about 40, at least about 50, at least about 75, at least about 90, at least about 100, at least about 125 or at least about 150 Newtons per square centimeter, while the desired electrode properties are present. In certain embodiments, the component of the anisotropic force normal to the active surface may, for example, define a pressure of less than about 200, less than about 190, less than about 175, less than about 150, less than about 125, less than about 115, or less than about 110 Newtons per square centimeter, while the desired electrode properties are present. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. patent application Ser. No. 12/535,328, filed Aug. 4, 2009, entitled "Application of Force in Electrochemical Cells" to Scordilis-Kelley et al. which are incorporated herein by reference in its entirety.

A variety of electrode active materials can be used in association with the electrodes comprising particulate electronically conductive material described herein. In certain embodiments (e.g., in some embodiments in which the electrode is used as a cathode), the electrode active material within the pores can comprise sulfur. For example, the electrode active material within the pores can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as the active cathode species, is described predominately, it is to be understood that wherever sulfur is described as a component of the electrode active material herein, any suitable cathode active species may be used. For example, in certain embodiments, the cathode active species comprises a hydrogen-absorbing alloy, such as those commonly used in nickel metal hydride batteries. One of ordinary skill in the art, given the present disclosure, would be capable of extending the ideas described herein to electrochemical cells containing electrodes employing other cathode active materials.

As noted elsewhere, in certain embodiments, the electrode (including, in some embodiments, the electrode precursor composition) comprises a binder. The term "binder" generally refers to material that is not an electrode active material and is not included to provide an electrically conductive pathway for the electrode. For example, an electrode might contain binder to facilitate internal cohesion within the cathode. Polymeric or non-polymeric binder materials can be used. Examples of binder materials include, but are not limited to, polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) or polyethylene oxide (PEO). In one set of embodiments, the binder material is poly(ethylene-co-propylene-co-5-methylene-2-norbornene) (EPMN), which may be chemically neutral (e.g., inert) towards cell components, including polysulfides.

The amount of binder within the electrode may be, in some embodiments, relatively small. For example, in some embodiments, binder makes up less than about 20 wt %, less than about 10 wt %, less than about 5 wt %, less than about 2 wt %, or less than about 1 wt of the mass of solids within the electrode. In certain embodiments, less than about 20 wt %, less than about 10 wt %, less than about 5 wt %, less than about 2 wt %, or less than about 1 wt % of the mass of solids within the electrode is made of up polymeric material.

In certain embodiments, the particulate electronically conductive material and the electrode active material make up a relatively large amount of the solids within the electrode. For example, in some embodiments, the particulate electronically conductive material and the electrode active material, together, make up at least about 60 wt %, at least about 70 wt %, at least about 80 wt %, at least about 90 wt %, or at least about 95 wt % of the mass of solids in the electrode.

In certain embodiments, the inventive electrodes described herein can be paired with a counter electrode in an electrochemical cell. In some such embodiments, the counter electrode can comprise lithium as an anode active material. Suitable electrode active materials comprising lithium include, but are not limited to, lithium metal (e.g., lithium foils, lithium deposited onto a conductive substrate, and the like) and lithium alloys (e.g., lithium-aluminum alloys, lithium-tin alloys, lithium-silicon alloys, and the like). In some embodiments, an electroactive lithium-containing material of an electrode active layer of a counter electrode comprises greater than 50 wt % lithium, greater than 75 wt % lithium, or greater than 90 wt % lithium Other examples of electrode active materials that can be used in the counter electrode include, but are not limited to, alkali metals (e.g., sodium, potassium, rubidium, caesium, francium), alkaline earth metals (e.g., beryllium, magnesium, calcium, strontium, barium, radium), and the like.

The electrodes and support structure configurations described herein can be used in electrochemical cells for a wide variety of devices, such as, for example, electric vehicles, load-leveling devices (e.g., for solar- or wind-based energy platforms), portable electronic devices, and the like. The term "electrochemical cell" includes primary and secondary electrochemical cells. Accordingly, the inventive electrochemical cell arrangements and materials described herein can be used in primary cells and/or in secondary cells (including primary batteries and secondary batteries), which can be charged and discharged numerous times. In some embodiments, the materials, systems, and methods described herein can be used in association with lithium-based electrochemical cells, and batteries thereof. For example, in certain embodiments, the electrodes comprising the porous support structures described herein can be used in electrochemical cells comprising another electrode comprising lithium, such as lithium metal and/or a lithium alloy. In certain embodiments, the materials, systems, and methods described herein can be used in association with lithium-sulfur electrochemical cells and/or batteries thereof.

U.S. Provisional Patent Application Ser. No. 61/987,271, filed May 1, 2014, and entitled "Electrode Fabrication Methods and Associated Systems and Articles," is incorporated herein by reference in its entirety for all purposes.

The following examples are intended to illustrate certain embodiments of the present invention, but do not exemplify the full scope of the invention.

EXAMPLE 1

This example describes the fabrication of smooth cathodes comprising sulfur-based electrode active materials and particulate electronically conductive material in the form of carbon additives. Smooth cathodes were fabricated by applying relatively large pressures to an electrode precursor composition. The electrode precursor composition was wetted prior to applying pressure.

The cathode precursor composition was formed by mixing Porocarb® HD3 porous carbon (Heraeus Quarzglas GmbH & Co., Kleinostheim, Germany), elemental sulfur (Sigma Aldrich, St. Louis, Mo.; mesh size of 100, and purity of 99.8%), a polyvinyl alcohol (PVOH) binder, and a solvent solution comprising isopropanol, de-ionized water and 1-methoxy-2-propanol. The final solids composition of the slurry was 55 wt % sulfur, 40 wt % carbon, and 5 wt % PVOH binder. The solids were added to the slurry until the solvent made up 70-85 wt % of the slurry.

The slurry was applied to an aluminum foil via a slot die method. The applied slurry was then dried to remove all solvent.

Next, two lint-free wipes were soaked in a mixture of 1:1 (by weight) water: isopropyl alcohol. The dried cathode (on the aluminum current collector) was then placed between the wet wipes. The wipes were sized such that their lateral boundaries extended beyond the lateral boundaries of the cathodes, thus completely covering the cathodes. The cathode compositions were then allowed to soak between the lint-free wipes for 2 minutes. After soaking, the cathode was removed from the wet wipes and the cathode compositions were positioned between two mirror-polished steel blocks, such that the cathode was in direct contact with the steel blocks. The steel blocks were then placed in a carver press and compressed—in four separate compression steps—at a pressure of 882.6 Newtons/cm$^2$ (90 kg$_f$/cm$^2$). Between each compression step, the cathode was removed and rotated 90 degrees while the orientation of the steel blocks was maintained.

Prior to the compression step, the root mean square (RMS) surface roughness ($R_q$) values of the cathodes were between 9.6 micrometers and 18.0 micrometers. After applying compressive pressure, however, the cathodes were much smoother, with external surfaces exhibiting RMS surface roughness values of 0.2 micrometers to 1.6 micrometers. For the RMS surface roughness measurements, the surface height was sampled over an area of 250,000 square microns, at 11× magnification, with a sampling point density of 1.227 points per square micrometer, evenly distributed across the sampled area.

After compression, the cathodes were integrated into electrochemical cells and tested. For each electrochemical cell, a 25 micrometer Celgard separator was positioned over the cathode. A 2 mil (50 micrometer) Li foil was used as the anode, and was positioned over the separator. The cells were then sealed and an electrolyte was added. The electrolyte included primarily 1-3 Dioxolane (DOL) and 1,2 Dimethoxyethane (DME) (both from Novolyte Technologies) as well as limited amounts of lithium bis(trifluoromethyl sulfonyl) imide, LiNO$_3$, Guanidine nitrate and Pyridine nitrate.

Figure 3:
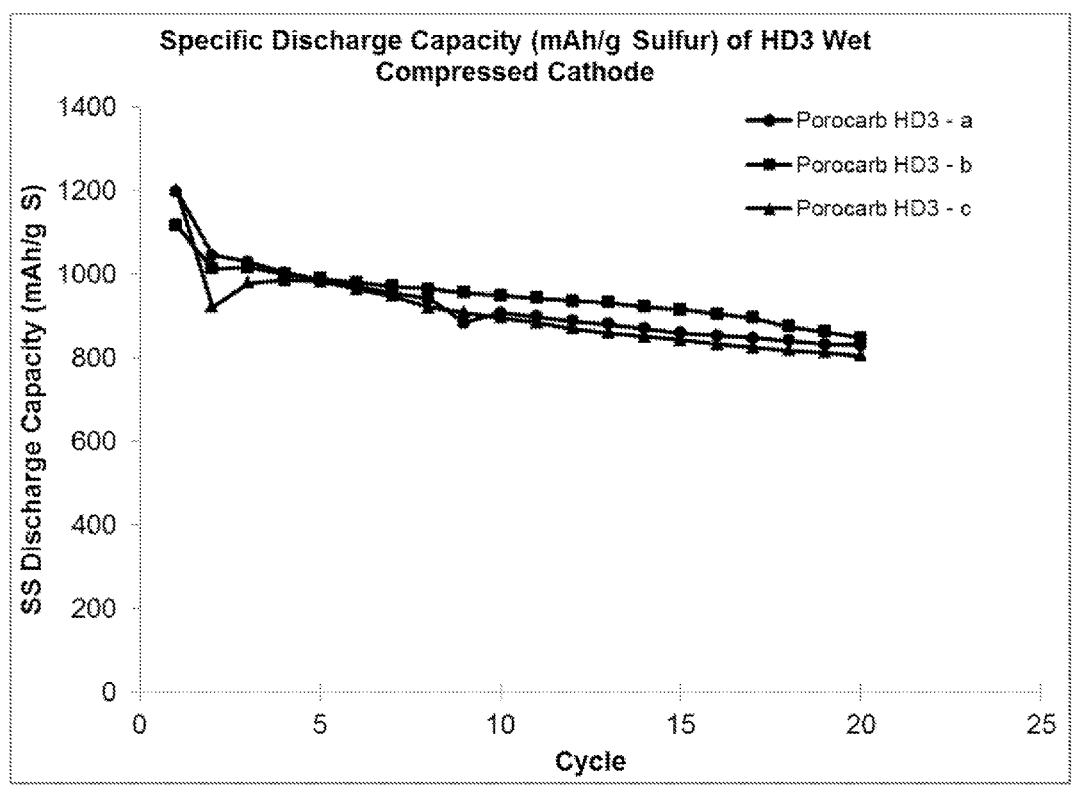
FIG. 3 is, according to certain embodiments, a plot of specific discharge capacity as a function of cycle number for electrochemical cells containing cathodes subject to a wet compression step.

Each of the cells was then electrochemically cycled. During charge and discharge, an anisotropic force defining a pressure of 98 Newtons/cm$^2$ (10 kg$_f$/cm$^2$) was applied to the cells. Charge and discharge performance was then measured by discharging the cells. During the first cycle, the cells were discharged at 1.3 mA (0.0392 mA/cm$^2$) from 2.5 V to 1.7 V and charged at 2 mA (0.0603 mA/cm$^2$) from 1.7 V to 2.5 V. During the 2nd cycle to the 20th cycle, the cells were discharged at 3.2 mA (0.0965 mA/cm$^2$) from 2.5 V to 1.7 V and charged at 2 mA (0.0603 mA/cm$^2$) from 1.7 V to 2.5 V. Cycling results are illustrated in FIG. 3. The cathode had an RMS surface roughness of 0.2 micrometers, and the cells were able to achieve a capacity of 1000 mAh/g. The capacity of the cells tapered slowly to 800 mAh/g over 20 cycles (as opposed to dropping significantly in capacity as seen with other amorphous carbons). Although the wet compressed cathode had a lower RMS surface roughness than the dry compressed cathode, cells including the wet compressed cathodes exhibited similar discharge capacities.

COMPARATIVE EXAMPLE 1

Electrochemical cells were assembled and tested as described in Example 1, except no pressure was applied to the cathode composition prior to integrating the cathodes into the electrochemical cells.

Figure 4:
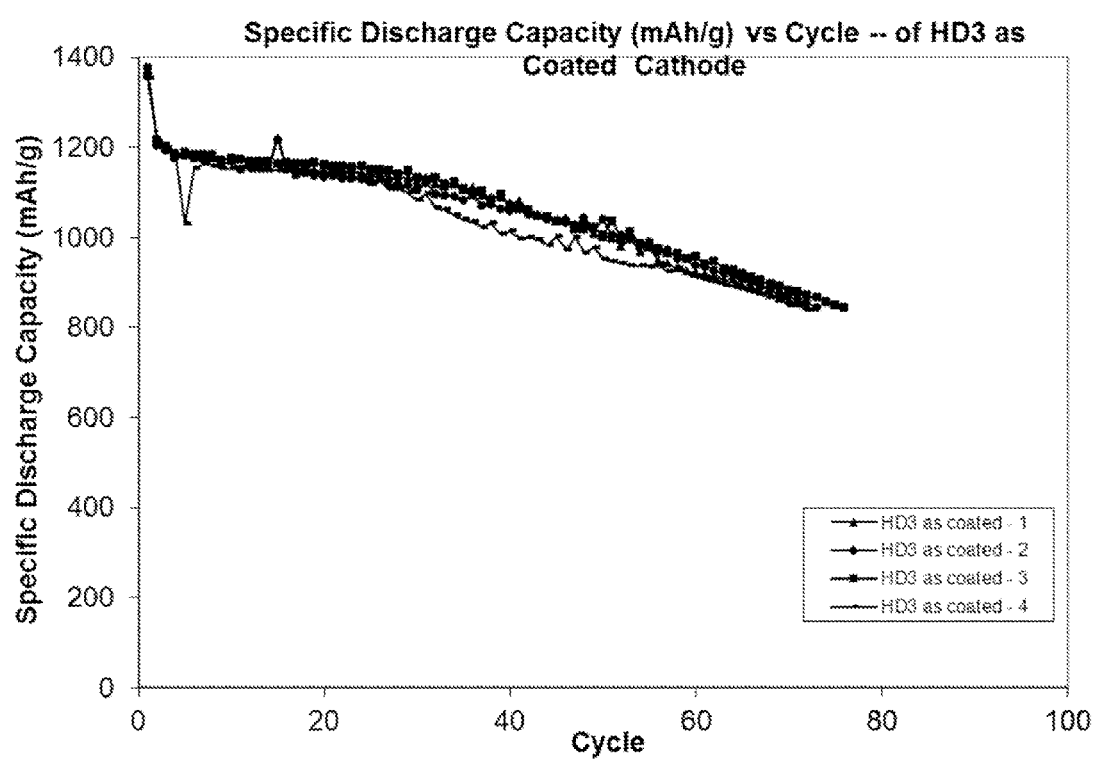
FIG. 4 is a plot of specific discharge capacity as a function of cycle number for electrochemical cells containing cathodes that were not subject to a compression step, according to some embodiments.

The electrochemical cells that included non-compressed cathodes were electrochemically cycled. During charge and discharge, an anisotropic force defining a pressure of 98 Newtons/cm$^2$ (10 kg$_f$/cm$^2$) was applied to the cells. Charge and discharge performance was then measured. For the first two cycles, the electrochemical cells were discharged at 4 mA (0.0402 mA/cm$^2$) from 2.5 V to 1.7 V. For the 3rd and subsequent cycles, the electrochemical cells were discharged at 40 mA (0.4022 mA/cm$^2$) from 2.5 V to 1.7 V. For all cycles, charging was performed at 25 mA (0.2514 mA/cm$^2$) from 1.7 V to 2.5 V. Cycling results are illustrated in FIG. 4. While the as-coated cathode exhibited a higher specific capacity than the compressed cathodes, the high RMS surface roughness of these electrodes damaged other components in the cell.

COMPARATIVE EXAMPLE 2

This example illustrates the benefit of including a liquid wetting agent when compressing an electrode precursor composition to form an electrode.

Electrode compositions were formed as described in Example 1. After the compositions had been formed, one set of electrode compositions ("Soaked Electrodes") was soaked between two wet, lint-free wipes then removed from the wet wipes prior to applying compression as described in Example 1. Another set of electrode compositions ("Dry Electrodes") were compressed as coated without any additional processing prior to compressing.

While the dry, compressed cathodes were smoother than cathodes to which no pressure was applied, the dry, compressed cathodes of this example were not as smooth (having RMS surface roughness values between 1.8 micrometers and 2.4 micrometers) as those described in Example 1 (which had RMS surface roughness values between 1.2 micrometers and 1.6 micrometers). In addition, the dry, compressed cathodes exhibited much more cracking than the wet, compressed cathodes.

Figure 5:
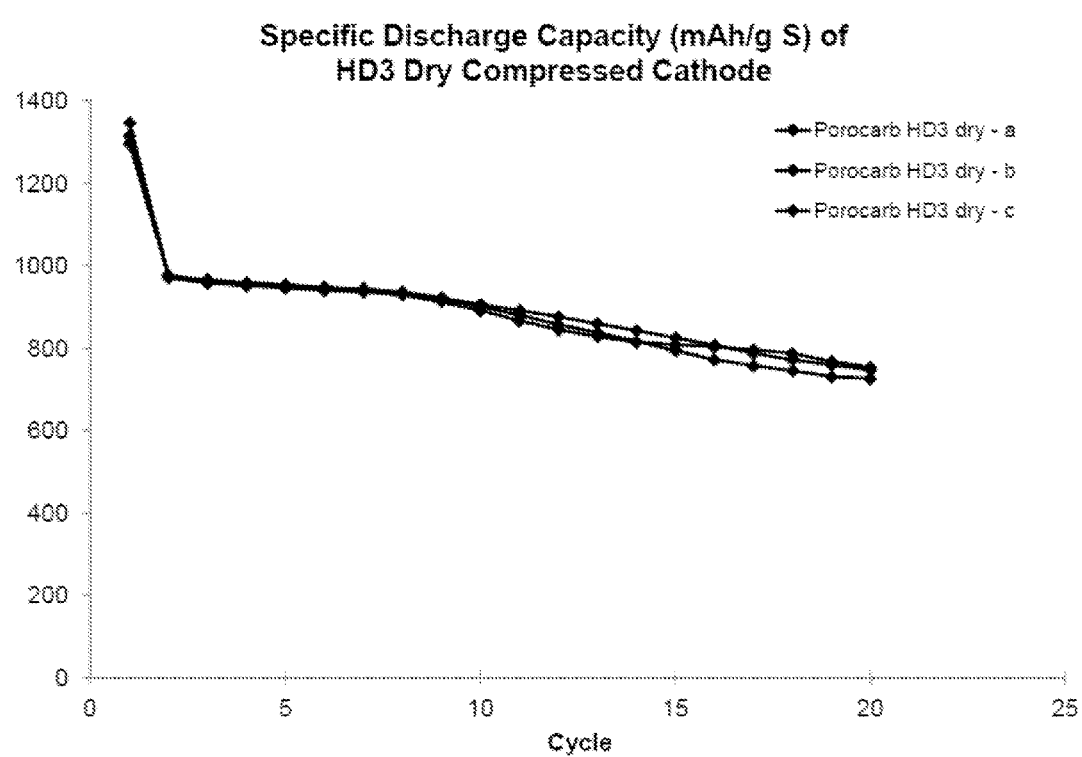
FIG. 5 is, according to some embodiments, a plot of specific discharge capacity as a function of cycle number for electrochemical cells containing cathodes that were subject to a dry compression step.

The dry, compressed cathodes were incorporated into electrochemical cells as described in Example 1 and electrochemically cycled. During charge and discharge, an anisotropic force defining a pressure of 98 Newtons/cm$^2$ (10 kg$_f$/cm$^2$) was applied to the cells. Charge and discharge performance was then measured. During the first cycle, the cells were discharged at 1.3 mA (0.0392 mA/cm$^2$) from 2.5 V to 1.7 V. During the 2nd and subsequent cycles, the cells were discharged at 3.2 mA (0.0965 mA/cm$^2$) from 2.5 V to 1.7 V. For all cycles, the cells were charged at 3 mA (0.0905 mA/cm$^2$) from 1.7 V to 2.5 V. Cycling results are illustrated in FIG. 5. The dry and wet compressed cathodes showed similar performance, with the wet compressed cathodes being smoother (and thus, less capable of damaging other cell components).

COMPARATIVE EXAMPLE 3

This example illustrates the reduction in performance that occurs when particulate electronically conductive material capable of maintaining its porosity under large applied pressures is replaced with particulate electronically conductive material that collapses under large applied pressures when forming an electrode.

Figure 6:
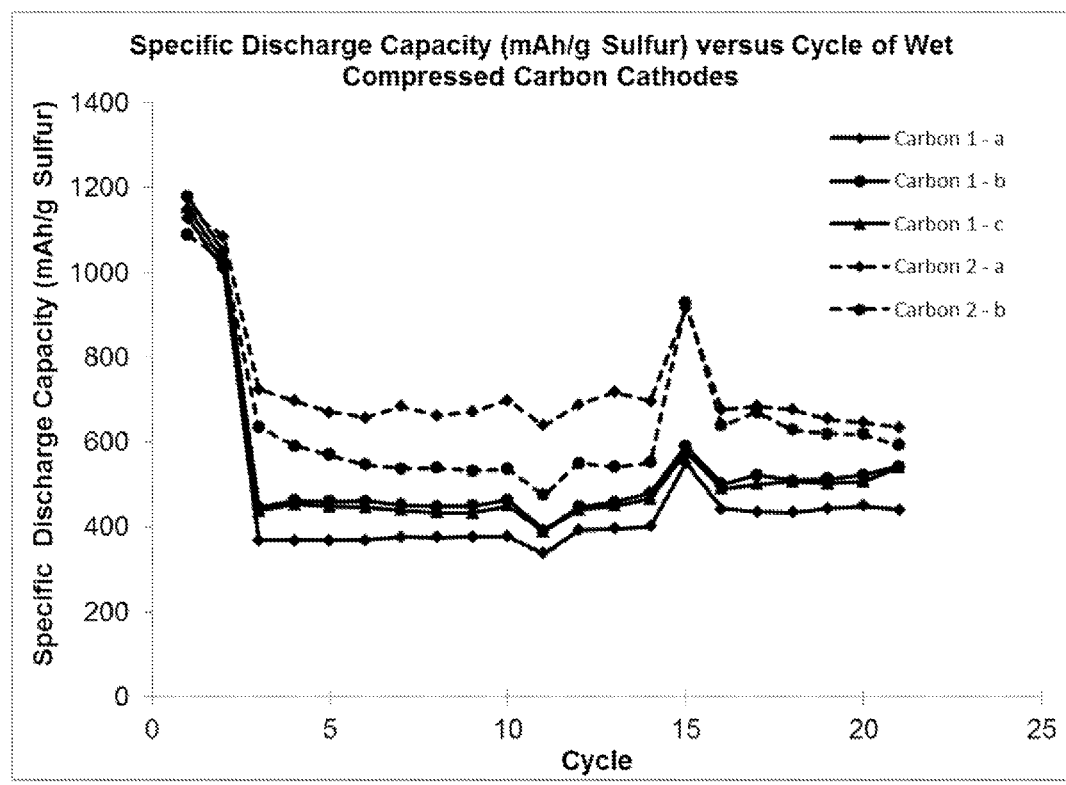
FIG. 6 is a plot of specific discharge capacity as a function of cycle number for electrochemical cells containing cathodes comprising amorphous carbon black (with limited intraparticle porosity) as an electronically conductive material.

Electrode compositions were formed as described in Example 1. However, rather than using Porocarb® HD3 porous carbon, amorphous carbon black was used as the particulate electronically conductive material. In one set of electrodes (corresponding to "Carbon 1" in FIG. 6), XE2 and Vulcan carbon black materials were used. In another set of electrodes (corresponding to "Carbon 2" in FIG. 6), Vulcan carbon black was used. The electrode compositions were compressed (while wet) to form electrodes including 55 wt % sulfur, 40 wt % carbon(s), and 5 wt % PVOH binder, and the electrodes were assembled into electrochemical cells, as described in Example 1. The resulting cells were electrochemically cycled. During charge and discharge, an anisotropic force defining a pressure of 98 Newtons/cm$^2$ (10 kg$_f$/cm$^2$) was applied to the cells. Charge and discharge performance was then measured, the results of which are illustrated in FIG. 6. For the first two cycles, the cells were discharged at 4 mA (0.0402 mA/cm$^2$) from 2.5 V to 1.7 V. For the 3rd and subsequent cycles, the cells were discharged at 40 mA (0.402 mA/cm$^2$) from 2.5 V to 1.7 V. Charging remained the same for all cycles, 25 mA (0.2514 mA/cm$^2$) from 1.7 V to 2.5 V.

As shown in FIG. 6, after the 2nd cycle, the capacities of the cells dropped. The cells continued to cycle below 700 mAh/g and were stopped at the 21st cycle. The discharge rate was modified at the 15th cycle, which resulted in an increase in capacity; however, when the discharge rate was changed back at the 16th cycle (to 40 mAh) the capacity again dropped.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of making an electrode, comprising:
   applying a pressure of at least about 590 Newtons/cm$^2$ to a composition comprising a particulate electronically conductive material, an electrode active material, a binder, and a liquid wetting agent to form the electrode.

2. A method of making an electrode, comprising:
   applying a pressure of at least about 1765 Newtons/cm$^2$ to a composition comprising a particulate electronically conductive material, an electrode active material, and a binder to form the electrode,
   wherein after the pressure has been applied to the composition, the electrode has a porosity of at least about 40%.

3. The method of claim 1, wherein after the pressure has been applied to the composition, the electrode has a porosity of at least about 40%.

4. The method of claim 1, comprising applying a pressure of from about 590 Newtons/cm$^2$ to about 6000 Newtons/cm$^2$ to the composition.

5. The method of claim 1, wherein the liquid wetting agent makes up at least about 1 wt % of the composition to which pressure is applied, at a point just before the pressure is applied to the composition.

6. The method of claim 1, wherein the liquid wetting agent makes up at least about 10 wt % of the composition to which pressure is applied, at a point just before the pressure is applied to the composition.

7. The method of claim 1, further comprising, after applying the pressure, removing at least about 50 wt % of the liquid wetting agent from the composition.

8. The method of claim 2, comprising applying a pressure of from about 1765 Newtons/cm$^2$ to about 6000 Newtons/cm$^2$ to the composition.

9. The method of claim 2, wherein the composition further comprises a liquid wetting agent that makes up at least about 1 wt % of the composition to which pressure is applied, at a point just before the pressure is applied to the composition.

10. The method of claim 2, wherein the composition further comprises a liquid wetting agent that makes up at least about 10 wt % of the composition to which pressure is applied, at a point just before the pressure is applied to the composition.

11. The method of claim 10, further comprising, after applying the pressure, removing at least about 50 wt % of the liquid wetting agent from the composition.

* * * * *